Jan. 19, 1965      J. DURAN      3,165,863
TELESCOPIC PLANT STAKE
Filed Aug. 22, 1963      2 Sheets-Sheet 1
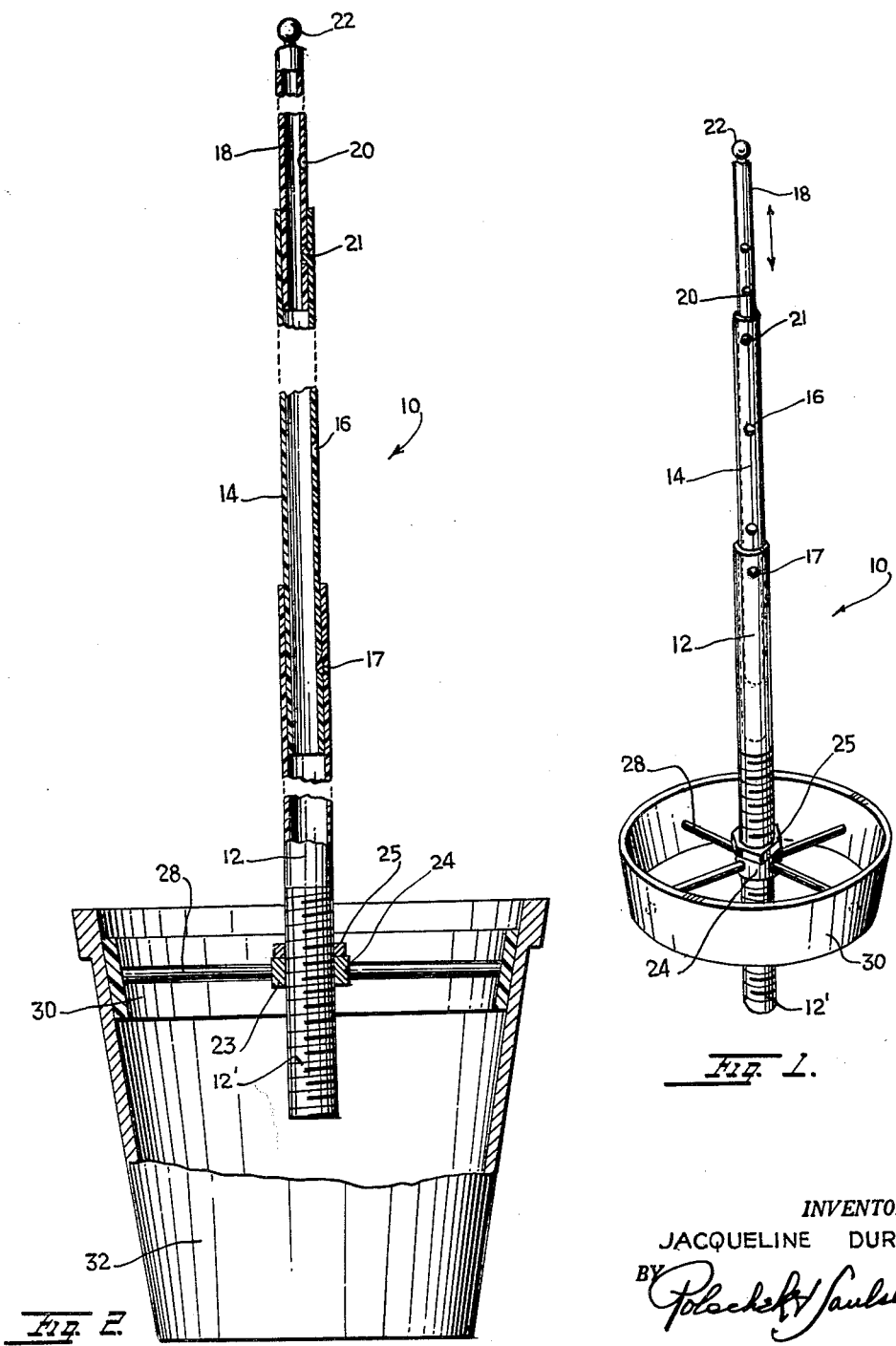
INVENTOR.
JACQUELINE DURAN
BY
ATTORNEYS

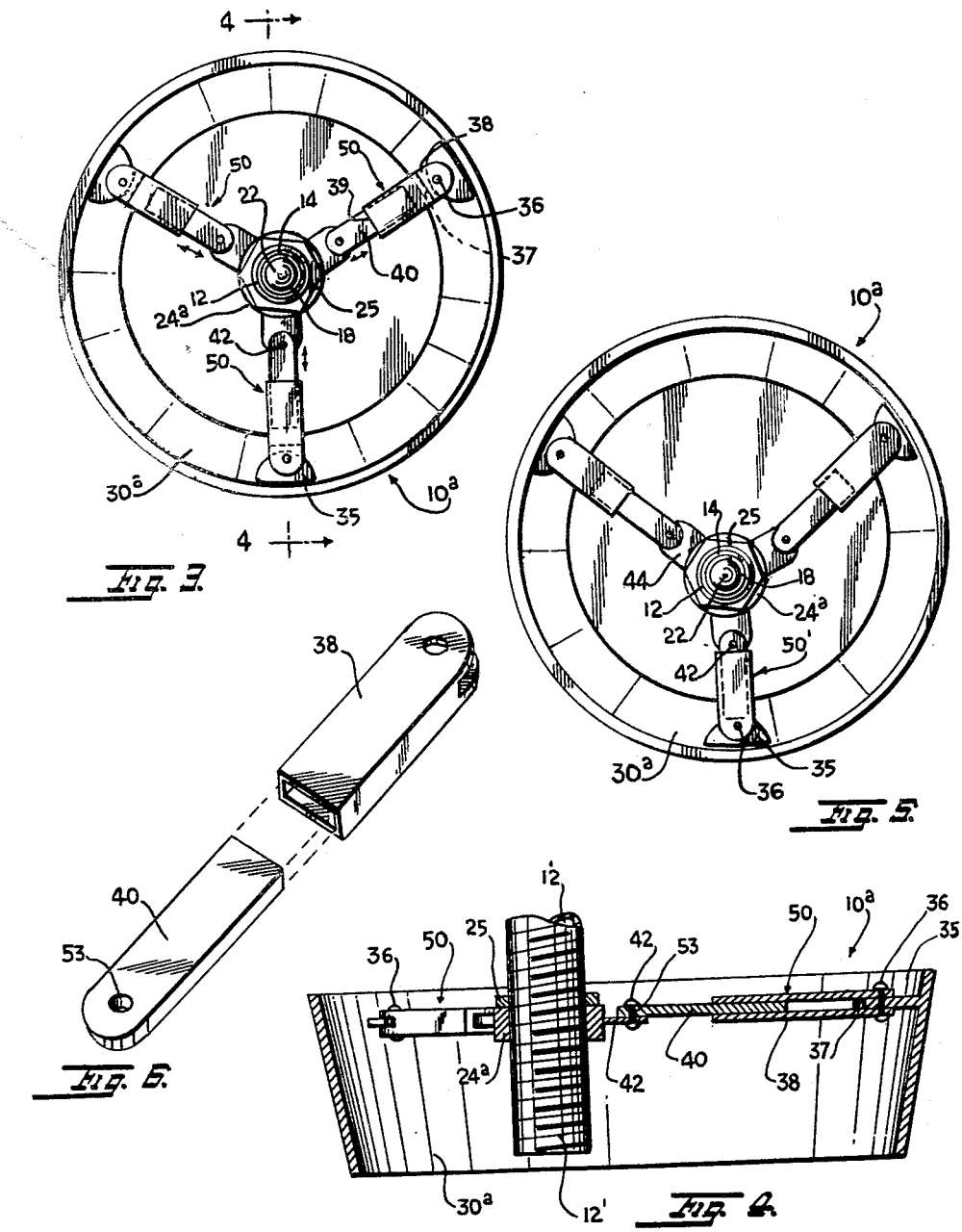

United States Patent Office 3,165,863
Patented Jan. 19, 1965

3,165,863
TELESCOPIC PLANT STAKE
Jacqueline Duran, 780 Locust St., New Milford, N.J.
Filed Aug. 22, 1963, Ser. No. 303,851
2 Claims. (Cl. 47—47)

This invention concerns a telescopic stake for supporting a plant or vine in a pot.

According to the invention there is provided a base which can be inserted into a flower pot. This base may include a conical band with a centrally located ring supported by radial spider arms on the band. A plurality of tubes are carried by the ring and extend axially upward from the ring. The tubes are telescopically arranged concentric with each other so that the vertical or axial length of the stake can be adjusted. Suitable catches are provided for holding the tubes in different positions of axial extension with respect to each other. The spider arms may also be telescopically arranged so that the position of the ring within the base can be changed for moving the axially telescoped tubes laterally away from the central axis of the pot.

It is therefore one object of the invention to provide a telescopic stake for a plant in a flower pot.

Another object is to provide a telescopic plant stake having an annular, frusto-conical band supporting a central ring with spider arms attaching the ring to the band and with axially telescoped tubes adjustably supported by the ring in axial extension from the ring.

Another object is to provide a telescopic plant stake as described, wherein the spider arms are telescopically arranged and pivotally attached to the band and ring to permit lateral movement of the ring and supported telescoped tubes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an oblique side view of a telescopic stake embodying the invention.

FIG. 2 is a sectional view of a flower pot and telescopic stake, parts being shown in side elevation and other parts being broken away.

FIG. 3 is a top plan view of another telescopic stake according to the invention.

FIG. 4 is a fragmentary sectional view on an enlarged scale taken on line 4—4 of FIG. 3.

FIG. 5 is a top plan view similar to FIG. 3 showing the ring and spider arms in different positions from those in FIG. 3.

FIG. 6 is an exploded perspective view of parts of a telescopic spider arm.

Referring to the drawings, there is shown in FIG. 1 a telescopic stake assembly 10 including a first axially vertical tube 12. Slidably fitted in tube 12 is another tube 14 of smaller diameter. Tube 14 has a series of holes or recesses 16 in which can selectively engage a catch member such as a rounded bead or projection 17 formed internally of tube 12 near the top thereof. Inside of tube 14 is another tube 18 of still smaller diameter. Tube 18 has holes 20 in which can selectively engage a rounded bead or projection 21 formed internally of tube 14 near the top thereof. The upper end of tube 18 may be closed and provided with a generally spherical tip 22 upon which a cord can be tied to support a plant. More than three tubes can be arranged in telescopic manner if desired and these tubes may have the same or different lengths. The tubes are all preferably made of plastic material which has some flexibility so that the inner tubes can slide past the inwardly projecting beads 17, 21, but will snap into engagement therewith at the holes 16, 20.

The lower end 12' of tube 12 may be externally threaded and engaged in a threaded hole 23 of a flat ring 24. The telescoped tubes 21, 14 and 18 thus extend arially upward from the plane of the ring and are adjustable therein. A locknut 25 may be provided at the lower end of the tube 12 at the ring to secure this tube in any position of adjustment. This arrangement permits large adjustment in length to be made by pulling the tubes outward axially with respect to each other. Finer adjustments in length can be made by screwing tube 12 in or out of ring 24.

A plurality of angularly spaced ribs or arms 28 extend radially outward of sockets in the ring and are secured to the inner surface of a frusto-conical band 30. As shown in FIG. 2, this band can fit snugly inside a conical flower pot 32. The telescoped tubes will be held erect in vertical axially aligned extension, with the ring 24 and arms 28 horizontal. Ample space is provided between the ring and band to permit free growth of a plant and passage of water and air to the plant roots. The pot will normally be filled with soil which will engage the bottom end of tube 12 and help to hold it erect. The soil will also bear against the inner side of the band 30 and hold the entire stake assembly stationary in the pot. The same stabilizing results will be obtained if the band is embedded in a window box of soil or even in the ground, with the lower end of the tube 12 extending below the bottom plane of the band.

FIGS 3–6 show another telescopic stake assembly 10a which parts corresponding to those of assembly 10 are identically numbered. On the inner side of the frusto-conical band 30a are a plurality of circumferentially spaced ears 35. Pivotally engaged on each of these ears by a rivet 36 is the slotted end 37 of a tubular arm member 38. This member is rectangular in cross section as clearly shown in FIGS. 4 and 6. Slidably fitted in the open end 39 of member 38 is one end of another arm member 40. The two telescoped members 38 and 40 constitute an arm 50 which is adjustable in length. Each arm member 40 is pivotally secured at its other end by a rivet 42 to one of a plurality of circumferentially spaced ears 44 attached to the periphery of ring 24a. Holes 51, 53 in the arm members receive rivets 36, 42.

Tube 12 is adjustably engaged in threaded hole 23 of ring 24a and locknut 25 holds this tube in fixed position. Tubes 14 and 18 are telescopically supported in tube 12 in axially vertical extension from the flat ring 24a.

FIG. 4 shows the ring 24a and telescoped tubes 12, 14, 18 centered within the annular conical band 30a. The arms 50 all have equal lengths. If it is desired to have a plant grow at the central axis of a pot, it will be necessary to move the telescoped tubes and ring laterally. This can be done easily by shortening one arm and lengthening the others. This is shown in FIG. 5 where arm 50' has been shortened with respect to the other arms 50" which have been lengthened to permit lateral displacement of the ring 24a and tubes 12, 14 and 18. The arm members 38, 40 are frictionally engaged with each other so that they will remain in the shortened or lengthened position set, and when the flower pot is filled with soil and engaging the bottom end of tube 12 the tubes and ring will be held in the laterally displaced off-center position.

There has thus been provided, according to the invention, a plant stake assembly adapted to hold a plurality of telescoped tubes in stabilized axially vertical position in a flower pot. In addition, telescoped arms are provided for laterally adjusting the telescoped tubes to various off-center positions in the flower pot.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A telescopic stake for supporting a plant in a flower pot, comprising a frusto-conical band adapted to fit snugly inside said pot, a flat ring inside the band and in the general horizontal plane thereof, three angularly spaced arms extending horizontally and radially from the ring to the inner side of said band, means for supporting the ring and arms in said horizontal plane each of said arms including two telescoped members axially slidable one within the other for adjusting the length of the arm, and said means for supporting the ring and arms including horizontally swingable substantially equi-angularly positioned pivot means between the inner and outer ends of the telescoped members and the ring and band, respectively, so that the ring and tubes supported thereby may be laterally shifted to off-center positions within the band, a first tube supported by said ring and extending axially upwardly therefrom perpendicular to the plane of the ring, a second tube having an external diameter substantially equal to the internal diameter of the first tube axially disposed in the first tube and slidable therein, and catch means on the first and second tubes for adjustably holding the tubes in fixed axial extension with respect to each other, said ring having a central threaded hole, said first tube having an externally threaded end engaged in the threaded hole of the ring so that the position of axial extension of the first tube from the ring is adjustable.

2. A telescopic stake for supporting a plant in a flower pot as defined in claim 1 wherein the first-named catch means includes a first series of holes spaced longitudinally along the second tube and a rounded projection extending inwardly of the first tube for selectively engaging in any of said series of holes, said further catch means including a second series of holes spaced longitudinally along the third tube and a rounded projection extending inwardly of the second tube for selectively engaging in any of the second series of holes, said first, second and third tubes formed of flexible material to facilitate engagement of the projections in said holes and disengagement therefrom.

References Cited in the file of this patent

UNITED STATES PATENTS

| | | |
|---|---|---|
| 500,140 | Kruger | June 27, 1893 |
| 597,841 | Dolf | Jan. 25, 1898 |
| 918,579 | Murch | Apr. 20, 1909 |
| 2,685,353 | Caskie | Aug. 3, 1954 |
| 2,821,353 | Hasenohrl | Jan. 28, 1958 |

FOREIGN PATENTS

| | | |
|---|---|---|
| 522,693 | France | Sept. 30, 1953 |
| 342,400 | Switzerland | Dec. 31, 1959 |